(12) United States Patent
John (10) Patent No.: US 7,924,280 B2
(45) Date of Patent: Apr. 12, 2011

(54) METHOD AND APPARATUS FOR PROCESSING OF DIAGNOSTIC IMAGE DATA

(75) Inventor: Matthias John, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 967 days.

(21) Appl. No.: 11/526,803

(22) Filed: Sep. 26, 2006

(65) Prior Publication Data
US 2007/0070068 A1    Mar. 29, 2007

(30) Foreign Application Priority Data

Sep. 27, 2005 (DE) .................... 10 2005 046 203

(51) Int. Cl.
*G06T 17/00* (2006.01)
(52) U.S. Cl. ......................................... 345/424
(58) Field of Classification Search .................. None
See application file for complete search history.

(56) References Cited

U.S. PATENT DOCUMENTS

| | | | |
|---|---|---|---|
| 5,611,025 A | | 3/1997 | Lorensen et al. |
| 5,708,691 A * | | 1/1998 | Zmora .............................. 378/4 |
| 7,576,740 B2 * | | 8/2009 | Dicken .......................... 345/424 |
| 2002/0090121 A1 * | | 7/2002 | Schneider et al. ............. 382/128 |
| 2002/0193687 A1 * | | 12/2002 | Vining et al. .................. 600/425 |
| 2003/0197704 A1 * | | 10/2003 | Tek et al. ....................... 345/474 |
| 2006/0276708 A1 * | | 12/2006 | Peterson et al. ............... 600/416 |

OTHER PUBLICATIONS

Hamish Carr, Torsten Möller, Jack Snoeyink, "Simplicial Subdivisions and Sampling Artifacts," Oct. 21, 2001, Proceedings of the Conference on Visualization '01.*
A.Puig et al.: "An Interactive Cerebral Blood Vessel Exploration System", Proceedings of the 8th IEEE Visualization '97 Conference, 1997, pp. 443-446.
D.Perchet et al.: "Advanced navigation tools for virtual bronchoscopy", Image Processing: Algorithms and Systems III; Proceedings of the SPIE, vol. 5298, May 2004, pp. 147-158.
C.W.Niblack et al.: <<Generating Skeletons and Centerlines from the Medial Axis Transform >>, Proceedings of the 10th International Conference on Pattern Recognition, 1990, Jun. 16-21, 1990, vol. pp. 881-885.

* cited by examiner

*Primary Examiner* — Jason M Repko
(74) *Attorney, Agent, or Firm* — Harness, Dickey & Pierce, P.L.C.

(57) ABSTRACT

A method is disclosed for processing of diagnostic image data. In one embodiment, the method includes determination of three-dimensional image information using an imaging medico-technical method, in which an examined volume is subdivided into a plurality of voxels and each voxel is allocated one measurement value, and selection of a subset of the voxels, with the measurement values which are associated with the selected voxels satisfying a specific relationship with a limit value. The method further includes identification of at least one cohesive volume area within the selected subset of the voxels, determination of a surface of the identified cohesive volume area, and determination of the distance between voxels within the cohesive volume area and the surface. Additionally, the method includes identification of volume elements within the cohesive volume area, with each volume element having a central voxel whose distance from the surface represents a local maximum, determination of a constriction within the cohesive volume area, which constriction separates identified volume elements from one another, and subdivision of the determined image information into a plurality of data subsets, with the constriction providing a boundary between the different data subsets.

24 Claims, 4 Drawing Sheets

METHOD AND APPARATUS FOR PROCESSING OF DIAGNOSTIC IMAGE DATA

PRIORITY STATEMENT

The present application hereby claims priority under 35 U.S.C. §119 on German patent application number DE 10 2005 046 203.0 filed Sep. 27, 2005, the entire contents of which is hereby incorporated herein by reference.

FIELD

The invention generally relates to a method for processing of data obtained using an imaging medico-technical diagnosis appliance, and/or to an apparatus which is suitable for carrying out the method.

BACKGROUND

Medico-technical diagnosis appliances such as X-ray computer tomography appliances or magnetic-resonance appliances can be used to produce three-dimensional representations of a tissue being examined, and to process the data. By way of example, it is possible to produce a view path within a three-dimensional model of an object, as is known in principle from U.S. Pat. No. 5,611,025 A. For this purpose, imaging information is segmented or subdivided into individual structures, in which case surface models can be produced from volume data.

In processing of three-dimensional image data, the entire volume under consideration can be subdivided into individual volume elements, also referred to as voxels. In medico-technical imaging methods, each voxel is typically allocated a gray-scale value which indicates physical characteristics, such as absorption characteristics of the tissue being examined. During the evaluation of three-dimensional diagnostic image data, it may be desirable to make only specific types of tissue visible, so that, for example, muscle tissue is displayed in a three-dimensional view, while bones are masked out. In order to select a specific type of tissue for a slice display or for a three-dimensional display from a more extensive data record, it is possible to select from the data record only those voxels whose gray-scale values are within a predetermined interval. However, this does not always allow a clean separation between a type of tissue to be displayed and a type of tissue which is not to be displayed.

SUMMARY

At least one embodiment of the invention includes obtaining selectively displaying diagnostic image data via a medico-technical appliance, in a particularly effective manner.

An imaging medico-technical method such as computer tomography or magnetic-resonance tomography provides three-dimensional image information. The examined volume is subdivided into a plurality of voxels, in which case it is not necessary to use Cartesian coordinates, and the individual voxels are not necessarily of the same type. Each voxel is allocated one measurement value, for example in the form of a gray-scale value, by way of the imaging method. In this context, the expression measurement value should not be understood as meaning that the relevant value has been obtained directly by way of a measurement. In fact, it may be a value which has been determined with the aid of any desired computation operations, based on data acquisition carried out by use of a medico-technical appliance. It is likewise possible to determine the so-called measurement value from a plurality of individual measurements, which can be carried out using different types of diagnosis appliances.

First of all, a subset for which the measurement values satisfy specific conditions, for example being above or below a minimum value or a maximum value, is selected from the voxels. Even at this stage, this provides a coarse subdivision into tissue which is to be displayed and tissue which is not to be displayed.

Furthermore, within the subset of selected voxels, volume areas are automatically identified which are formed by cohesive voxels, that is to say mutually adjacent voxels, for which the previously applied selection condition is satisfied. If there is only one such volume area within the three-dimensional image data, then it can be assumed that the image information which is relevant for diagnostic purposes will be found within this volume area. However, it is likewise also possible for a plurality of island-like volume areas, which are intrinsically each cohesive, to be identified within the selected subset of voxels.

Irrespective of how many volume areas have been identified within the examined total volume, the surface of this volume area or of these volume areas is determined. In general, a voxel for which the selection condition is satisfied and which is at the same time not only adjacent to a further voxel for which this condition is satisfied, but also to voxels for which this condition is not satisfied is considered to be a voxel which is located on the surface of a cohesive volume area. The so-called surface of the cohesive volume area is thus in general a surface or boundary surface, for which the expression surface will be used in the following text. It is also possible to use smoothing functions during the process of determination of the surface, for example in such a manner that a voxel which is adjacent only to a single voxel outside the cohesive area but are otherwise exclusively voxels which should be included in the volume area is not regarded as a voxel on the surface of the cohesive volume area.

In the next step, the distances between voxels arranged within the cohesive volume area and the surface are determined. A plurality of voxels are then used to automatically identify cohesive volume elements in the cohesive volume area, with a volume element being denoted as such when it has a so-called central voxel whose distance from the surface of the cohesive volume area forms a local maximum. In other words: if a voxel is exclusively surrounded by voxels which are at a shorter distance from the surface, then this voxel is the central voxel of a volume element of the cohesive volume.

By way of example, a thickened area of a body in the form of a strand represents a volume element for the purpose used here. In geometric extreme cases, it is even conceivable for a plurality of voxels within one volume element to be of the same maximum distance, within this volume, from the surface. In a situation such as this, it is necessary to unambiguously determine which of the voxels should be regarded as the central voxel. In a simple situation, by way of example, this can be done by recording a spatial direction and by choosing as the central voxel that one of the voxels which is at the same distance from the surface and is located in front of the other voxels in the recorded spatial direction, or it satisfies some other defined relationship to the other voxels of the same distance from the surface.

Alternatively, in situations in which a plurality of voxels is initially being considered as a central voxel in a volume element, it is also possible to consider not only these voxels themselves but also the distances from the surface of the adjacent voxels surrounding these voxels. For example, for each voxel which may be the central voxel, it is possible to form a value which indicates the sum of the distances from the surface of those voxels which are adjacent to this voxel. That voxel for which this value is a maximum is assumed to be the single central voxel in that volume element.

It may be possible to identify a plurality of volume elements which each have one central voxel in a cohesive volume area. However, it is likewise also possible for there to be only a single volume in the cohesive volume area whose distance from the surface represents a local maximum. In this situation, the cohesive volume area is at the same time a volume element in the described sense. The following text is based on the assumption that at least one cohesive volume area has a plurality of volume elements.

In a further step, the point at which volume elements which have been identified within the cohesive volume areas are adjacent to one another is determined. The boundary between two volume elements which each have one central voxel forms a constriction in the cohesive volume area. A constriction clearly occurs when a strip could be placed around this constriction which cannot be moved on the surface of the cohesive volume area. Within the constriction which forms a separating surface between adjacent volume elements, one central voxel exists as the central separation point, which is surrounded by a closed ring of voxels which are closer to the surface and are at the same time adjacent to two voxels which are arranged on opposite sides of a plane which lies tangentially on the separating surface, and are further away from the surface than the central voxel. The constriction between the adjacent volume elements can thus be determined without knowing the central voxels of the two volume elements. The at least one constriction plays a major role in the further processing of the image information, that is to say of the measurement values which are associated with the individual voxels.

The three-dimensional image information obtained by way of the imaging medico-technical method is subdivided into a plurality of data subsets, specifically into at least one data subset to be displayed and at least one data subset that is not to be displayed. In general, a data subset to be displayed is understood as being image information which is made visible by means of an output appliance such as a screen or a printer. In the following text, the expression data subset to be displayed is used irrespective of whether the corresponding data is actually intended to be displayed, to be stored or to be processed further. An analogous situation applies to the so-called data subset which is not to be displayed.

A first subdivision into image information to be displayed and image information which is not to be displayed is provided just by the selection of a subset of the voxels as described above. However, during this selection process, all that is done is to compare the measurement values associated with the individual piece voxels with one or more limit values, independently of the geometry of the structures recorded using the imaging medico-technical method. One limit value which is a governing factor for determining whether a voxel is allocated to the selected subset may be predetermined by programming, in particular to be variable. In principle, it is also possible to use hardware to implement limit values which are used to decide whether a measurement value is taken into account or is rejected for the further image processing.

In fundamental contrast to the selection of a subset of the voxels by way of one or more limit values, the geometry of the object being examined, specifically the shape of the cohesive volume area identified within the selected subset of voxels, is taken into account in a subsequent step in the image processing method. Automatic delineation between a data subset to be displayed and a data subset which is not to be displayed is carried out on a constriction within a cohesive volume area. At least one volume element, which has a central voxel, in the cohesive volume area is thus allocated to a data subset to be displayed, while another volume element, which likewise has a central voxel, is allocated to a data-subset which is not to be displayed. This allocation process of different mutually adjacent volume elements to different data subsets can be carried out automatically even when the central voxels in the various volume elements have not been identified. In particular, the dimensions of the volume elements and of the constriction or constrictions can be used as a subdivision criterion for the automatic allocation of the volume elements of the same cohesive volume area to different data subsets.

When carrying out the image processing method, one or more of the variables which will be explained in the following text is or are preferably determined, and is or are taken into account in the allocation of the image information items to different data subsets:

The size of a constriction is defined as the radius of the largest sphere which can be positioned within the constriction. The size of a volume element, in particular of a volume element which is adjacent to a constriction, is defined as the radius of the largest sphere which can be positioned within that volume element. Based on these definitions, the depth of a constriction is defined as the difference between the minimum of the sizes of the volume elements adjacent to the constriction and the size of the constriction.

The square of the size of a constriction as well as of a volume element are defined in a similar manner: the square of the size of a constriction is the square of the radius of the largest sphere which can be positioned within the constriction, while the square of the size of the volume element is defined as the square of the radius of the largest sphere which can be positioned within the respective volume element. The square of the depth of a constriction can be derived from this, defined as the difference between the minimum of the square of the sizes of the volume elements which are adjacent to one another on the constriction and the square of the size of the constriction.

If a selected subset of the voxels including the associated measurement values has a plurality of constrictions, subdivided between one or more cohesive volume areas, then the various volume elements are preferably automatically allocated different data subsets on the basis of variable criteria. In one example refinement, in particular, absolute and/or relative dimensions of volume elements and constrictions can be defined on the basis of relevant conditions which govern whether mutually adjacent volume elements are allocated to the same data subset. A minimum depth and/or a minimum square of the depth of a constriction can preferably be set, which must be provided in order to allocate those volume elements which are adjacent to the constriction to different data subsets.

In one example refinement, the operator of the image processing system has the capability to select one volume element and to make a change in the association between this volume element and/or of at least one further volume element, which is adjacent to the selected volume element, and a data subset. This makes it possible, for example, for the user to include a detail, which is adjacent to a displayed volume element, in a three-dimensional display in this display as well, or to mask it out from this display. The user who is using an input appliance, for example a computer mouse, to select one volume element which is adjacent to one or more constrictions on at least one further volume element is offered a selection menu which, in particular, makes it possible to increase or decrease the degree of detail on the display. Adjacent volume elements which can optionally be displayed or not displayed can always be distinguished by constrictions of a cohesive volume area, with the position of the constrictions being determined automatically.

Even without selection of one volume element, the user has the capability to determine the minimum size or minimum square of the size from which a volume element, in particular a volume element which is adjacent to a further volume element on a constriction, will be displayed.

The volume examined in the imaging medico-technical method is in the simplest case subdivided into cuboid voxels. In this case, one voxel is surrounded by 26 further voxels. According to one particular example embodiment, the volume is subdivided on a tetrahedric basis, in which case one voxel is surrounded by 14 further voxels.

Briefly, the processing of the diagnostic image data is carried out as follows: in order to suitably combine elementary regions, those of the plurality of constrictions which have the shallowest depth are first of all selected automatically. The elementary regions which are separated by this constriction are combined, with all the voxels in the smaller elementary region being allocated to the larger elementary region. The smaller elementary region thus ceases to exist as an autonomous region.

In the same way, the constriction is no longer considered to be a constriction for the rest of the processing, so that it disappears for the purposes of automatic image identification and processing. Once again, that one of the remaining constrictions which has the shallowest depth is selected in the next step, which is likewise carried out automatically, and the adjacent elementary regions are combined in the described manner. The square of the depth or a depth of a constriction defined in some other way can also be used instead of the depth in the individual processing steps. In any case, the method is continued until all of the remaining constrictions are deeper than a preferably variable limit value. This results in an object being sensibly subdivided into regions, for example in the case of a blood pool in an image data record, a subdivision into heart vessels.

The described automatic method is suitable for production of a considerably less fine subdivision, for example with up to 20 areas, from an extremely fine subdivision of elementary volume areas, for example with up to 100,000 areas. Respectively adjacent regions are combined step-by-step as far as a threshold value, during which process the user still does not need to make any selection. The user selection is envisaged only subsequently from the less-fine subdivision. In many applications, correct segmentation is carried out just when the user selects a single elementary region, with this elementary region having been formed by automatic combination of a plurality of mutually adjacent elementary regions. If required, the user can also have a more far-reaching influence on the processing of the elementary regions, for example he can restart the entire process of combination of elementary regions using different image processing parameters.

The image processing method and system according to at least one embodiment of the invention are particularly advantageous in applications in which either vessels, in particular heart vessels, are being examined, or vessels are intended to be deliberately masked out from a three-dimensional display. In both cases, subdivision of the image data and constrictions results in a particularly worthwhile subdivision capability into image information to be displayed on the one hand, and image information which is not to be displayed on the other hand.

BRIEF DESCRIPTION OF THE DRAWINGS

One example embodiment of the invention will be explained in more detail in the following text with reference to the drawings, in which.

DETAILED DESCRIPTION OF THE EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referencing the drawings, wherein like reference numerals designate identical or corresponding parts throughout the several views, example embodiments of the present patent application are hereafter described.

The example embodiment is based on the examination of the left-hand atrium of a patient by use of computer tomography (CT) or magnetic resonance (MR). In general, the medico-technical diagnosis appliance, which may also be in the form of a C-arm appliance, is referred to as a modality.

Figure 1:
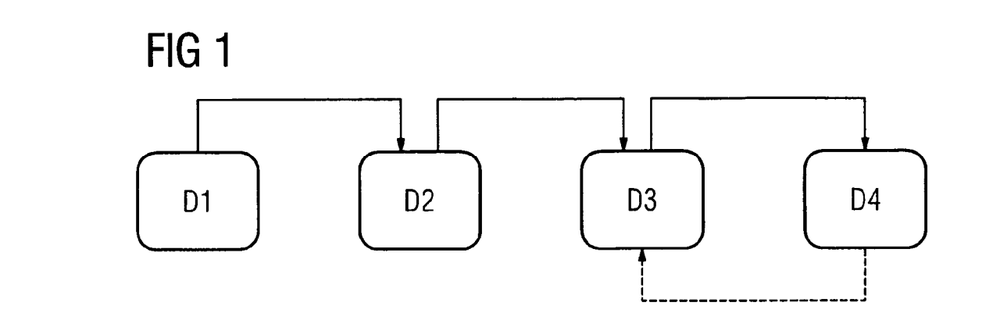
FIG. 1 shows a simplified scheme of a method for processing of diagnostic image data.

FIG. 1 illustrates the major steps in the processing of the image data obtained using the modality, in the form of a simplified flowchart. The modality produces raw data D1, which is also referred to as the input image. The aim of the examination carried out using the modality is, for example, to determine sizes such as volumes, diameters or diameter ratios in a heart vessel, that is to say a medical measurement. The raw data D1 includes three-dimensionally resolved gray-scale values, with a blank structure having a low gray-scale value, and a dense structure having a gray-scale value. The higher the gray-scale value, the brighter the corresponding structure is displayed. In order to make the interior of blood vessels clearer than surrounding structures, the blood can have a contrast agent added to it, in manner known per se. The input image D1 is not yet suitable for carrying out the medical measurement, in its unprocessed form.

Segmented data D2 is obtained from the raw data D1 by use of variable limit values. This process, by which all those parts of the image which have been recorded using the modality and whose gray-scale value is outside a relevant range are masked out, is also referred to extraction. The segmented data D2 represents the so-called blood pool, and can also include structures such as bones, which are not intended to be displayed, but whose gray-scale value is within the range selected for the segmentation process.

Subdivided data D3 is obtained from the segmented data D2 by way of a decomposition process, which will be explained in more detail in the following text and, in particular, takes account of constrictions in the recorded structures. The volume examined in the diagnostic method is subdivided into individual volume areas, which are each intrinsically cohesive, with the decision being made automatically on the basis of geometric features as to which part of the recorded structures is displayed, in order to allow the medical measurement.

Finally, the subdivided data D3 or that part of the subdivided data D3 which is intended to be displayed is combined to form processed data D4. The user has the capability to influence the processing of the data, as is indicated by a dashed line leading from the processed data D4 to the subdivided data D3. The processed data D4, which may also be subject to post-processing by the user, in practice includes exclusively the relevant structures, and allows the medical measurement to be carried out.

Figure 3:
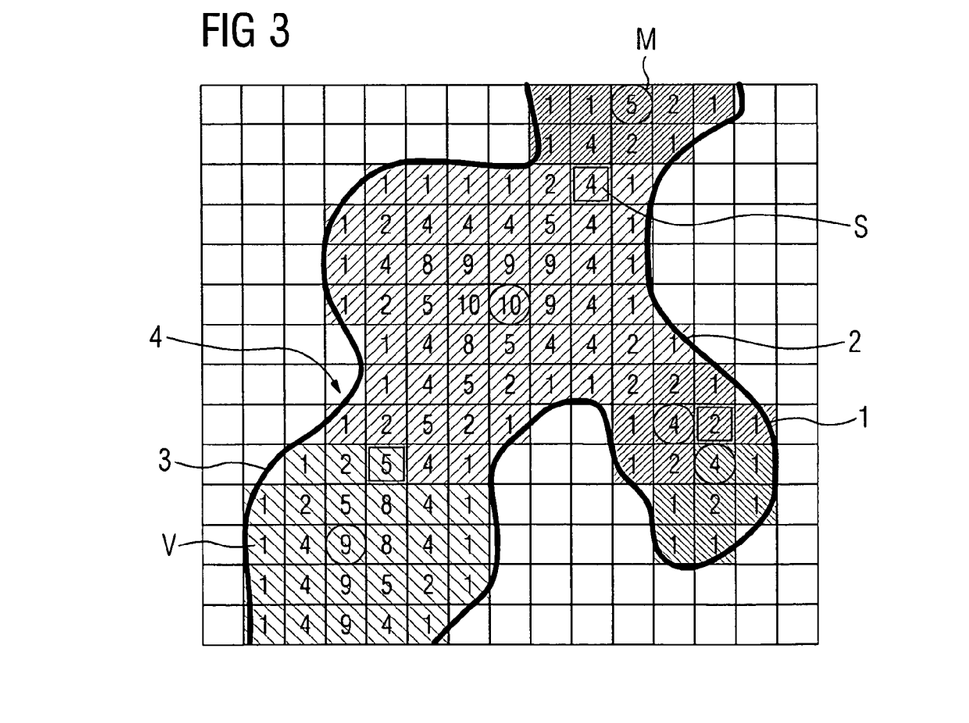
FIG. 3 shows a cross section of a cohesive volume area subdivided into a plurality of volume elements.

FIG. 3 illustrates, schematically, a slice from a volume being examined using the modality. The volume is subdivided into individual voxels V, which can be identified by a square cross section in the symbolized illustration, however actually preferably formed by a tetrahedric spatial subdivision, that is to say by the formation of a tetrahedron. A voxel V such as this is surrounded by precisely 14 further voxels. In FIG. 3, those voxels V in which no number is entered represent a blank space or volume, in which the gray-scale value which is in general referred to as the measurement value is below a variable threshold value. The other voxels V, which together form a cohesive volume area 1, symbolize the tissue being examined using the modality, for example a heart vessel. The numbers entered in the voxels V each indicate the square of the distance between the relevant voxel V and the surface of the cohesive volume area 1, which is annotated with the reference 2.

The voxels V whose shortest distance from the surface 2 represents a local maximum M are illustrated surrounded by circles in FIG. 3. The distance between a voxel V and the surface 2 is the Euclidean distance or an approximation of the Euclidean distance. Alternatively, it is also possible to use a different distance definition. Overall, the visible detail of the cohesive volume area 1 has five local maxima M. Each of these maxima M forms the centerpoint of a volume element 3, which is referred to as an elementary region, within the cohesive volume area 1. The maximum M in an elementary region 3 can be regarded as the centerpoint of a sphere which is arranged in this elementary region 3 and whose radius is a maximum. The radius of this sphere is referred to as the size of the elementary region 3. The square of the radius analogously denotes the square of the size of the elementary region 3.

Each voxel V which forms a local maximum M in the cohesive volume area 1, that is to say the centerpoint of an elementary region 3, is surrounded by voxels V which are closer to the surface 2. Voxels V such as these thus form rising chains which end at the local maximum M. Each voxel V within the chain can be added to the elementary region 3.

A constriction 4 is formed between two adjacent elementary regions 3 in the same cohesive volume area 1. Those voxels V which are located in the constriction 4 describe a section surface as the boundary between the two elementary regions 3. A voxel V which is arranged centrally in the section surface and is referred to as a saddle point S is identified in FIG. 2 by a square surround. Each saddle point S is surrounded by a ring of voxels V which are closer to the surface 2. Furthermore, at least two voxels V exist which are adjacent to the saddle point S, are further away from the surface 2 in the saddle point S, and are separated from one another by the ring.

Figure 2:
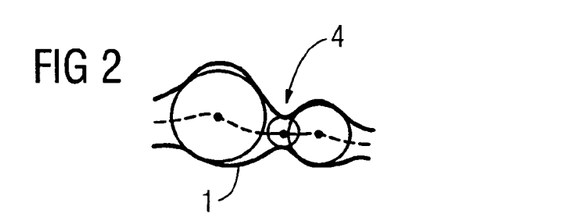
FIG. 2 shows a section illustration of a cohesive voxel area with one constriction.

These two voxels V belong to different elementary regions 3. In order to identify the constriction 4 in the described manner, however, there is no need to have any knowledge of the elementary region 3, in particular no identification of their local maxima M. The size of the constriction 4 is defined as the radius of the largest sphere which can be pushed through the constriction 4. The square of the size of the constriction 4 is analogously the square of the radius of this sphere.

Based on the definitions of the size and of the square of the size of the volume element 3 and of the constriction 4, the depth of the constriction 4 is defined as the difference between the size of the smaller volume element 3 adjacent to the constriction 4 and the size of the constriction 4. If the squares of the sizes are used in each case, this results in the square of the depth of the constriction 4.

The constrictions 4 which the cohesive volume area 1 has, in particular in the form of narrowed areas of a blood vessel (see FIG. 2) are automatically organized on the basis of their depth. Those elementary regions 3 which are adjacent to the constriction 4 may be dealt with either in the same way or differently in terms of data. In this context, identical data treatment means that the data which is associated with the two elementary regions 3 is stored in a logically linked form such that either the two elementary regions 3 are displayed together, or neither of these elementary regions 3 is displayed. Conversely, the different data treatment of two elementary regions 3 means that it is possible to display one of these elementary regions 3, that is to say the associated gray-scale values, while the second elementary region 3 is masked out.

The depth or the square of the depth of the constriction 4 between these elementary regions 3 plays a major role in the decision (which can be made automatically or influenced by the user) on the data treatment of mutually adjacent elementary regions 3. A minimum depth and/or a minimum square of the depth can preferably be set, which a constriction 4 must have in order to allow the elementary regions 3 which are adjacent to it to be treated differently for data purposes, in the sense explained above.

If the minimum depth or the minimum square of the depth of a constriction 4 is less than the relevant limit value, then those elementary regions 3 which are adjacent to the constriction 4 are combined, in which case, as a rule, the depths as well as the squares of the depths of further constrictions 4 will also change in this step. The combination of elementary regions 4 can be carried out on a user-control basis or automatically. Independently of this, it is also possible to mask out isolated elementary regions 3, whose size or square of the size is below a preferably variable limit value, automatically or under user control. In a similar manner, an elementary region 3 which is part of a cohesive volume area 1, in particular an elementary region 3 which is linked to a cohesive volume area 1 at only a single constriction 4, can be masked out automatically, provided that the size or the square of the size of the elementary region 3 does not exceed a variable threshold value.

An originally cohesive volume area 1 can in this way be broken down into a plurality of volume areas. The procedure for automated further image processing is preferably also defined for this situation. For example, the smaller of the remaining volume areas which, for example, indicates a relatively small blood vessel, is automatically removed from the display. The user has the capability at any time to reverse such removal of a detail from a three-dimensional structure. It is likewise possible to mark an elementary region 3 or a cohesive volume area 1 in order to process its data in a specific manner.

By way of example, the image processing system offers the capability to define the need to always treat two volume areas which are separated from one another as a cohesive volume area 1, that is to say either to display them jointly or to mask them out jointly. Furthermore, the capability is provided to first of all select one elementary region 3 or one cohesive volume area 1 in order, in one or more further steps, to deliberately add to the display or to mask out from this display elementary regions 3 which are adjacent to this region or to this area.

Figure 4:
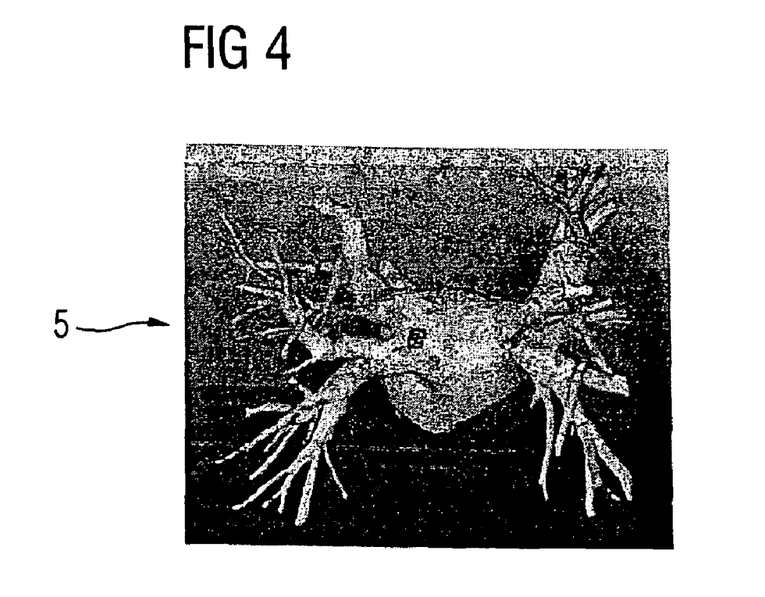
FIGS. 4, 5 show perspective views of a left-hand atrium.
Figure 5:
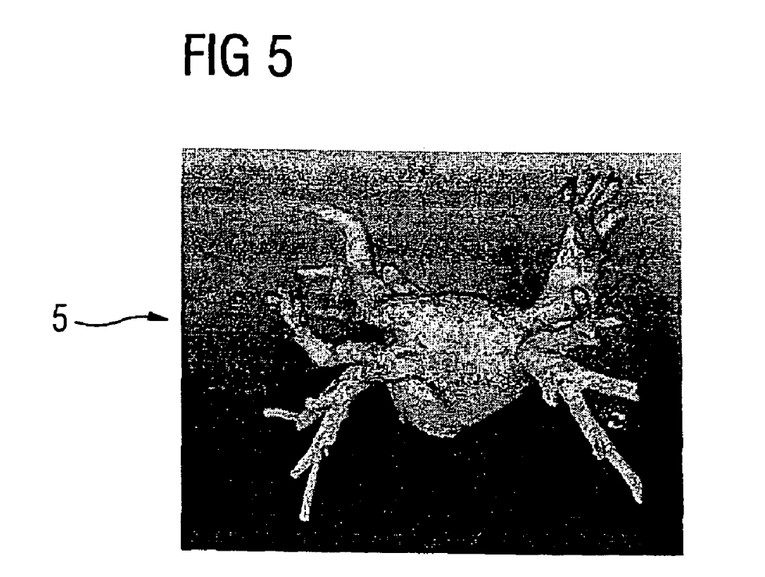

FIGS. 4 and 5 show one example of the image processing in various processing stages. A left-hand atrium 5 can be seen in each case. While FIG. 4 shows numerous blood vessels linked to the atrium 5, some of these blood vessels, specifically those with a particularly small diameter, which are irrelevant for the medical measurement to be carried out, are masked out in FIG. 5. The limits between the structures which are visible and are masked out in the display are always produced by automatically identified constrictions 4.

Figure 6:
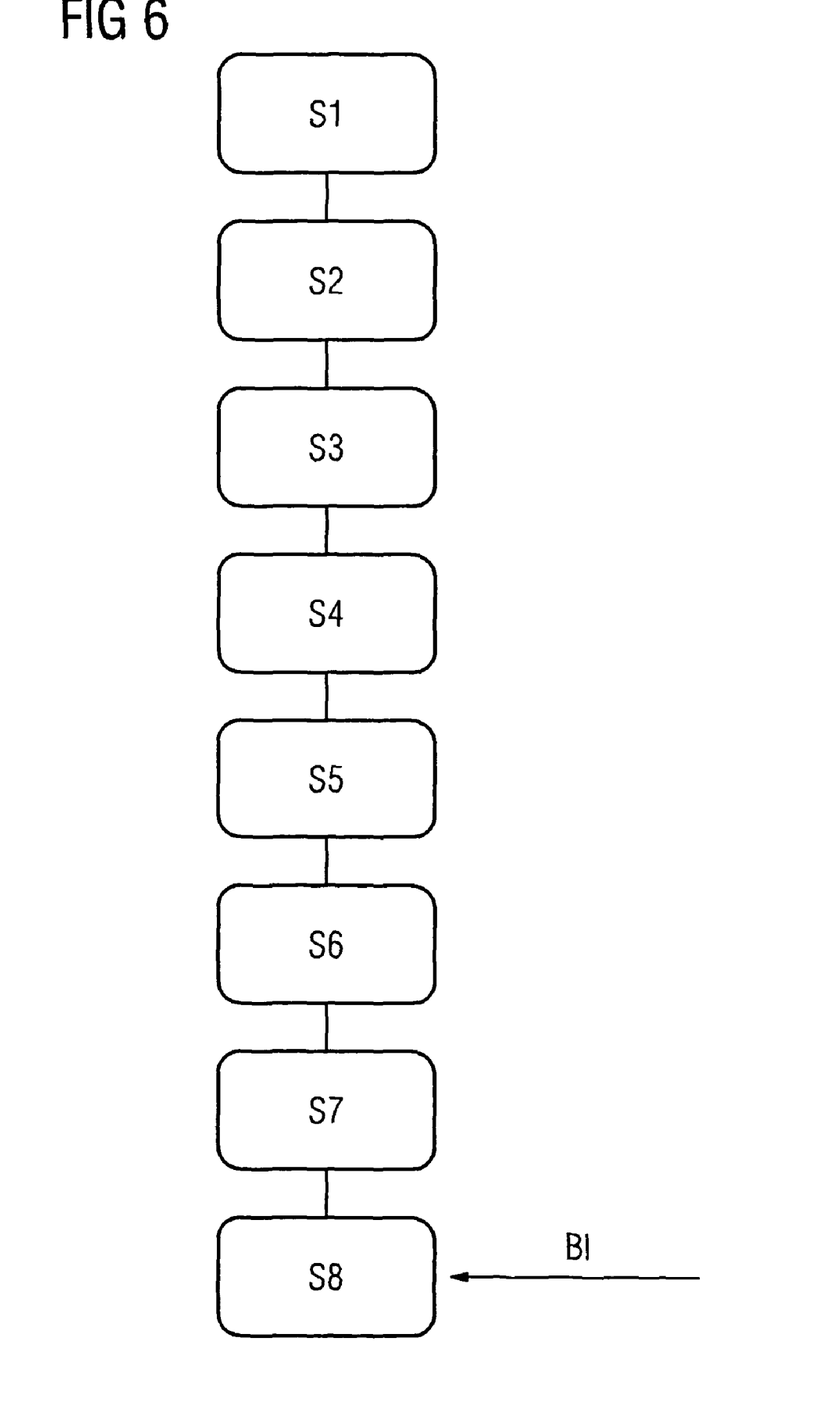
FIG. 6 shows a more detailed scheme of the method for processing of diagnostic image data, and FIG. 7 uses a symbolized illustration to show a system for obtaining and processing of diagnostic image data.

FIG. 6 shows the individual steps in the method for processing a diagnostic image data, in the form of a flowchart and in more detail than in FIG. 1.

In a first step S1 in the imaging medico-technical method, a three-dimensional image information is determined, without any dependency on a specific recording modality, for example an X-ray, magnetic-resonance or ultrasound appliance. The volume which is examined using the medico-technical method is subdivided into a plurality of volume elements V, referred to for short as a voxel. Each voxel V is allocated at least one measurement value, generally a so-called gray-scale value, which, for example, indicates the absorption of X-ray radiation in that voxel V.

In the next step S2, a subset is selected from the totality of the voxels V, for which the associated measurement values have a specific relationship with at least one defined limit value, in the simplest case being above a threshold value. This step results in the segmented data D2 (FIG. 1), which typically represents the so-called blood pool. The limit values of the segmentation of the blood pool should not be set to be too narrow, since tissue of the same type can produce different measurement values in the imaging medico-technical method, depending on the examination parameters. These are referred to as noisy images. Even if they are subject to severe noise, even images such as these can be used in the image processing method since characteristic geometric features of the tissue being examined remain identifiable even in a noisy image.

The following step S3 for the first time takes account of the geometry of the structures recorded using the imaging method: at least one cohesive volume area 1 is identified within the selected subset of voxels V. By way of example, this is the atrium 5. The image processing method is not dependent on the precise shape of the heart vessels. No shapes can be predetermined in a model. For example, it is thus irrelevant whether the left atrium 5 has four and only four pulmonary veins.

Irrespective of the shape of the cohesive volume area 1, the surface 2 of this volume area 1 is determined in the next step S4. Smoothing functions and error-correction functions can be used during this process. The surface 2 is generally considered to be a surface on which the measurement values associated with the voxels V change to a major extent over a short distance. For example, a boundary surface between volume areas of different density is thus also regarded as a surface 2. A section surface within the cohesive, identical volume area 1 is not considered to be a surface in this processing stage, although the boundary between a region to be displayed and a region which is not to be displayed can form such a surface, at a later stage, as will be explained in more detail in the following text.

The distance between the voxels V within the cohesive volume area 1 and the surface 2 is determined in the next step S5. Irrespective of the precise distance definition, the distance is always considered to be the shortest distance between a voxel V and a point on the surface 2.

The step S6 is used to identify the volume elements 3, which are referred to as elementary regions, within the cohesive volume area 1, while the step S7 is used to determine at least one constriction 4 which separates a plurality of volume elements 3 from one another. The steps S6 and S7 can be carried out in any desired sequence, or can be combined to form a single step. In any case, the entire cohesive volume area 1 is broken down into elementary regions 3 which themselves no longer have any constriction. Each elementary region or volume element 3 has one central voxel V whose distance from the surface 2 represents a local maximum M. This central voxel V need not necessary be determined in order to carry out the image processing method, but can be used for identification of the volume elements 3.

Finally, the image information obtained by way of the imaging medico-technical method is subdivided into a plurality of data subsets T1, T2 (FIG. 7) in step S8. Each data subset T1, T2 includes information relating to the position of voxels V and to the associated measurement values. Each voxel V can be allocated to only one of the data subsets T1, T2. A constriction 4, which has already been identified automatically, forms a boundary between the different data subsets T1, T2. The data subsets T1, T2 include at least one data subset T1 to be displayed and at least one data subset T2 which is not to be displayed. Visible structures are thus separated from structures which cannot be seen in illustration, at one or more constrictions 4.

For example, entire blood-vessel trees can be removed from a three-dimensional display. Visible structures which comprise at least one elementary region 3 remain in the display. The subdivision of image data into visible image information, that is to say image information associated with the data subset T1, and image information which cannot be seen, that is to say image information associated with the data subset T2, can be changed by user interaction BI.

By way of example, the user selects a desired region which he wishes to view within a three-dimensional image data record. Depending on the selected parameters, the image processing system then for example shows all of those elementary regions 3 which are linked to the selected region. Only a single cohesive volume area 1 is thus displayed in this way. The user now has the capability to select individual elementary regions 3, which are separated from one another by constrictions 4, in order to allow these to be selectively displayed or deleted on an isolated basis, that is to say associated with the second data subset T2.

Figure 7:
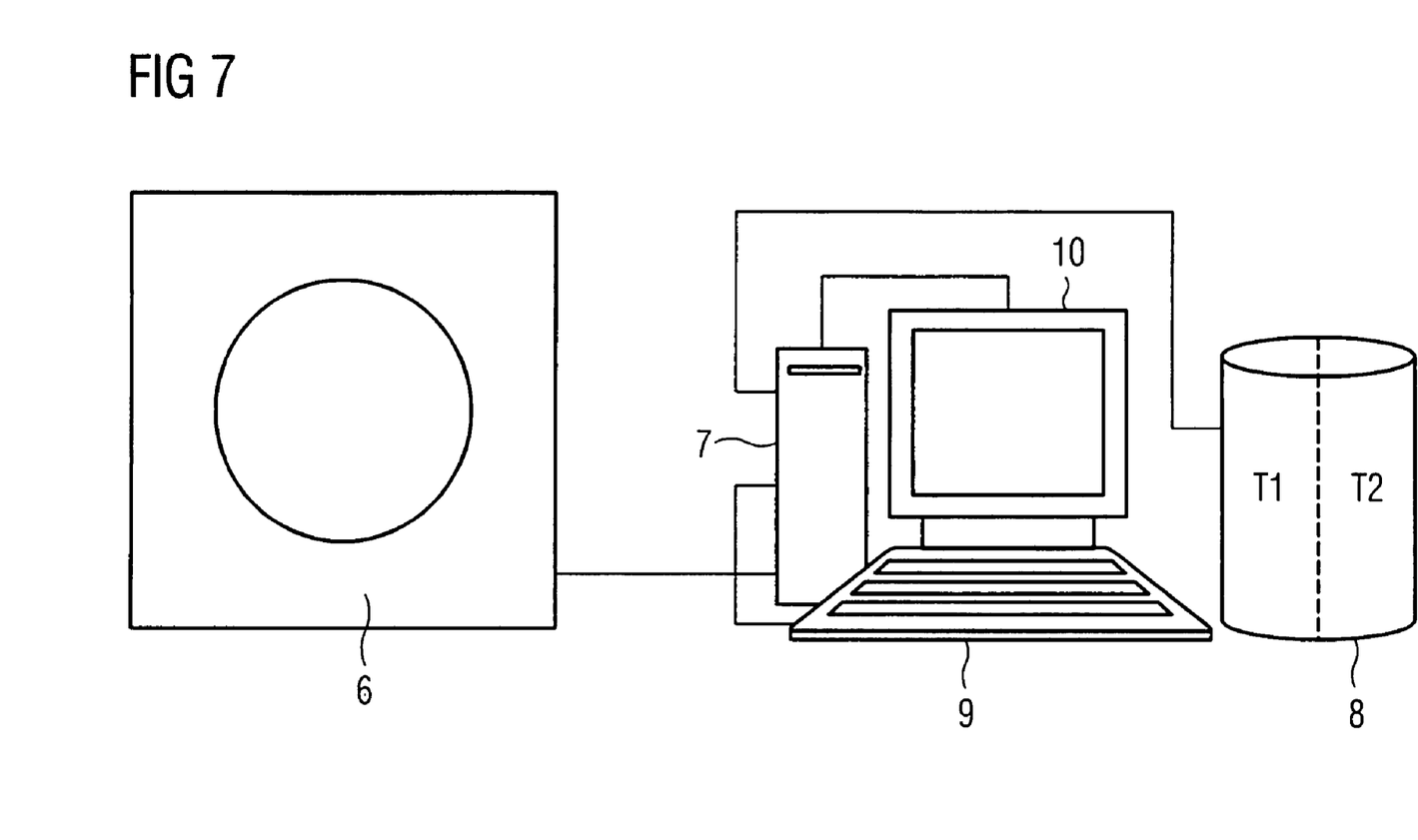

FIG. 7 shows, in a coarsely schematic form, an apparatus for obtaining and processing of diagnostic image data. An imaging medico-technical diagnosis appliance 6, for example a computer tomography, is connected for data purposes to an evaluation unit 7 which is programmed in such a manner that it can carry out the image processing method according to at least one embodiment of the invention.

The evaluation unit 7 is connected to a storage unit 8, an input apparatus 9, for example in the form of a keyboard and/or a mask, and an output apparatus 10, for example a screen or a printer. The storage unit 8 is used for storage of image information obtained by the diagnosis appliance 6, in which case a logical distinction is drawn, as explained above with reference to FIG. 6, between the first data subset T1, which is intended to be displayed by way of the output apparatus 10, and the second data subset T2, which is not intended to be displayed. Each elementary region 3 is allocated completely to one of the data subsets T1, T2.

The use of automatically identified constrictions 4 as characteristic features for the processing of the image data allows rapid, robust subdivision of image information, as appropriate to the situation, into the various data subsets T1, T2. The expression robustness of the subdivision of the image information in this case means the characteristic of the image processing system to produce similar results with similar input or raw data D1 (FIG. 1). The evaluation unit 7 allows the automatic segmentation, which defines constrictions 4 as in boundaries between elementary regions 3, of an image data record with 512×512×512 voxels V in less than 60 seconds. The image processing method is particularly suitable for cardiology applications.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for processing of diagnostic image data, comprising:
    determining three-dimensional image information using an imaging medico-technical method, in which an examined volume is subdivided into a plurality of voxels and each voxel is allocated a measurement value;
    selecting, by an evaluation device, a subset of the voxels from at least some of the plurality of voxels, the measurement values associated with the selected voxels satisfying a specific relationship with at least one defined limit value;
    identifying at least one cohesive volume area within the selected subset of the voxels;
    determining a surface of the identified cohesive volume area;
    determining the distance between voxels within the cohesive volume area and the surface;
    identifying volume elements within the cohesive volume area, with each volume element including a central voxel whose distance from the surface represents a local maximum;
    determining a constriction within the cohesive volume area, which separates identified volume elements from one another;
    combining volume elements that are mutually adjacent to the constriction to form a larger sub-region within the cohesive volume area only if the depth of the constriction is less than a constriction limit value; and
    subdividing the determined image information into a plurality of data subsets, the constriction providing a boundary between the different data subsets.

2. The method as claimed in claim 1, wherein the size of the constriction, defined as the radius of the largest sphere positionable within the constriction, and the size of the volume elements which bound the constriction, defined as the radius of the largest sphere positionable within the respective volume element, are determined.

3. The method as claimed in claim 2, wherein the depth of the constriction, defined as the difference between the minimum of the sizes of the mutually adjacent volume elements and the size of the constriction, is determined.

4. The method as claimed in claim 1, wherein a minimum depth of the constriction, which must be provided in order to allocate the volume elements which are adjacent to it to different data subsets, is adjustable.

5. The method as claimed in claim 2, wherein a volume element, adjacent to a further volume element on a constriction, is associated with the data subset to be displayed only if a variable minimum size is exceeded.

6. The method as claimed in claim 1, wherein the square of the size of the constriction, defined as the square of the radius of the largest sphere positionable within the constriction, and the square of the size of the volume elements adjacent to the constriction, defined as the square of the radius of the largest sphere positionable within the respective volume element, are determined.

7. The method as claimed in claim 6, wherein the square of the depth of the constriction, defined as the difference between the minimum of the square of the sizes of the mutually adjacent volume elements and the square of the size of the constriction, is determined.

8. The method as claimed in claim 7, wherein the square of the depth of the constriction is used as a criterion for combination of mutually adjacent volume elements to form a larger sub-region within the cohesive volume area.

9. The method as claimed in claim 8, wherein the minimum square of the depth of the constriction, which must be given in order to allocate the volume elements adjacent to it to different data subsets, is adjustable.

10. The method as claimed in claim 6, wherein a volume element, adjacent to a further volume element on a constriction, is associated with the data subset to be displayed only if a variable minimum square of the size is exceeded.

11. The method as claimed in claim 1, wherein user-control selection of a volume element allows a change to be made in the association between at least one of the volume element and at least one adjacent volume element, and a data subset.

12. The method as claimed in claim 1, wherein the examined volume is subdivided into a plurality of voxels in such a manner that one voxel is surrounded by 14 further voxels.

13. A non-transitory computer readable medium including program segments for, when executed on a computer device, causing the computer device to implement the method of claim 1.

14. The method as claimed in claim 1, wherein the depth of the constriction, defined as the difference between the minimum of the sizes of the mutually adjacent volume elements and the size of the constriction, is determined.

15. The method of claim 1, wherein the combining volume elements comprises:
automatically selecting the constriction having a shallowest depth and combining the volume elements which are separated by the constriction having the shallowest depth.

16. The method of claim 1, wherein the constriction forms a separating surface between adjacent volume elements and one center voxel exists as a central separation point, wherein the center voxel is surrounded by a string of voxels that are closer to the surface and adjacent to two voxels arranged on opposite sides of a plane lying tangentially on the separating surface, the string of voxels being further away from the surface than the center voxel.

17. The method of claim 1, further comprising:
breaking down the entire cohesive volume into volume elements such that none of the volume elements have any constriction; wherein
the combining is performed after the entire cohesive volume is broken down.

18. The method of claim 1, wherein the local maximum is a local maximum distance among distances between voxels within the cohesive volume area and the surface of the cohesive volume.

19. An apparatus for obtaining and processing of diagnostic image data, comprising:
an imaging medico-technical diagnosis appliance, wherein a volume examined using the diagnosis appliance is subdivided into a plurality of voxels, a measurement value being allocated to each voxel;
a storage unit to store image data obtained using the diagnosis appliance; and an evaluation unit programmable to,
select one subset from the totality of the voxels which form the examined volume, by use of a limit value applicable to the measurement values,
identify at least one cohesive volume area of recorded image data within the selected subset,
determine a surface of the identified cohesive volume area,
determine the distance between voxels within the cohesive volume area and the surface,
identifying volume elements within the cohesive volume area, with each volume element including a central voxel whose distance from the surface represents a local maximum,
determine a constriction within the cohesive volume area, which separates identified volume elements from one another,
combine volume elements that are mutually adjacent to the constriction to form a larger sub-region within the cohesive volume area only if the depth of the constriction is less than a constriction limit value, and
subdivide the determined image data into a plurality of data subsets, the constriction providing a boundary between the different data subsets.

20. The apparatus as claimed in claim 19, wherein the imaging medico-technical diagnosis appliance is an X-ray computer-tomography appliance.

21. The apparatus as claimed in claim 19, wherein the imaging medico-technical diagnosis appliance is a magnetic-resonance appliance.

22. The method as claimed in claim 1, wherein the subdividing includes subdividing the determined image information into at least one data subset to be displayed and at least one data subset that is not to be displayed, the constriction providing a boundary between the different data subsets.

23. The apparatus as claimed in claim 19, wherein the subdividing includes subdividing the determined image information into at least one data subset to be displayed and at least one data subset that is not to be displayed, the constriction providing a boundary between the different data subsets.

24. A non-transitory computer readable medium, for use in an apparatus for obtaining and processing of diagnostic image data, wherein a volume examined using the diagnosis appliance is subdivided into a plurality of voxels, one measurement value being allocated to each voxel, and wherein image data is stored, the computer readable medium including program segments for, when executed on a computer device, causing the computer device to implement a method comprising:
selecting one subset from the totality of the voxels which form the examined volume, by use of a limit value applicable to the measurement values,
identifying at least one cohesive volume area of recorded image data within the selected subset,
determining a surface of the identified cohesive volume area,
determining the distance between voxels within the cohesive volume area and the surface,
identifying volume elements within the cohesive volume area, with each volume element including a central voxel whose distance from the surface represents a local maximum,
determining a constriction within the cohesive volume area, which separates identified volume elements from one another,
combining volume elements that are mutually adjacent to the constriction to form a larger sub-region within the cohesive volume area only if the depth of the constriction is less than a constriction limit value, and
subdividing the determined image data into a plurality of data subsets, the constriction providing a boundary between the different data subsets.

* * * * *